(12) United States Patent
Wang

(10) Patent No.: US 7,044,991 B2
(45) Date of Patent: May 16, 2006

(54) DUST-COLLECTING STRUCTURE OF A DUST-COLLECTING DEVICE

(76) Inventor: Chun Hsiang Wang, PO Box 82-144, Taipei (TW)

( * ) Notice: Subject to any disclaimer, the term of this patent is extended or adjusted under 35 U.S.C. 154(b) by 245 days.

(21) Appl. No.: 10/224,509

(22) Filed: Aug. 21, 2002

(65) Prior Publication Data

US 2004/0035092 A1 Feb. 26, 2004

(51) Int. Cl.
*B01D 29/13* (2006.01)
*B01D 29/62* (2006.01)
*B01D 46/02* (2006.01)

(52) U.S. Cl. .................. 55/366; 55/356; 55/378; 55/429; 55/472; 55/480

(58) Field of Classification Search .................. 55/356, 55/366, 367, 373, 378, 429, 467, 472, 480
See application file for complete search history.

(56) References Cited

U.S. PATENT DOCUMENTS

| | | | | |
|---|---|---|---|---|
| 3,006,020 A | * | 10/1961 | Fillery .................. | 15/323 |
| 3,653,190 A | * | 4/1972 | Lee et al. .................. | 55/302 |
| 3,853,517 A | * | 12/1974 | Mitchell .................. | 55/288 |
| 3,961,921 A | * | 6/1976 | Heiman et al. .................. | 55/429 |
| 4,133,658 A | * | 1/1979 | Callewyn .................. | 55/315 |
| 4,323,377 A | * | 4/1982 | Jolin .................. | 55/341.7 |
| 4,695,299 A | * | 9/1987 | Spadaro et al. .................. | 96/416 |
| 4,735,639 A | * | 4/1988 | Johnstone .................. | 55/302 |
| 4,963,172 A | * | 10/1990 | DeMarco .................. | 55/429 |
| 5,163,985 A | * | 11/1992 | Chen .................. | 55/356 |
| 5,226,938 A | * | 7/1993 | Bailey et al. .................. | 55/305 |
| 6,221,135 B1 | * | 4/2001 | Wirth, Jr. et al. .................. | 95/273 |
| 6,507,974 B1 | * | 1/2003 | Cheng .................. | 15/347 |

* cited by examiner

*Primary Examiner*—Robert H. Spitzer
(74) *Attorney, Agent, or Firm*—Leong C. Lei

(57) ABSTRACT

A dust-collection structure of a dust-collection device includes a body, a dust-collection module, a moving seat and a dust-filtering module. The cart body is provided with a blower having a driving member and the top face of the blower is provided with a connection tube connecting to the dust-filtering module; the dust-collection module is a hollow cylindrical body positioned onto the cart and the cylindrical body is used to hold the dust-collection bag and the top edge of the cylindrical body is a connection body for mounting with the moving seat; the moving seat comprises two upward extended upright rods mounted at the cart body and the top end of the upright rod is pivotally connected with a corresponding extended shaft and the connecting body is locked between two extended shafts, and the circumferential edge of connection body is provided with a connection tube to connect with the dust-suction tube.

9 Claims, 4 Drawing Sheets

US 7,044,991 B2

DUST-COLLECTING STRUCTURE OF A DUST-COLLECTING DEVICE

BACKGROUND OF THE INVENTION (a) Technical Field of the Invention

The present invention relates to a dust-collecting structure and in particular, the dust-collecting structure of a dust-collecting bag mounted within a dust-collecting device.

(b) Description of the Prior Art

At wood processing plants, mobile and portable types of dust-collecting apparatus are used to suck dust particles around the work site so as to provide cleaner air to the workers. Normally, a dust-collecting module is positioned beneath a dust-withdrawing device and by means of a blower to proceed with the collection of dust particles. However, this conventional type of dust collection stores the collected dust particles within the dust collection module and therefore the cleaning of the collected dust particles will cause the dust particles to disperse all around the work site.

Taiwanese Patent Publication No.: 437447 related to dust-collection bag positioning structure discloses a ringed bag having the external edge being provided with a plurality of hook section for mounting onto the dust-collection bag, and the bag being inserted into the dust-collection module. In view of the conventional structure, there are drawbacks as follows:

(1) Not convenient in the course of replacement of a dust collection bag. In replacement, the dust-withdrawing module and the center ringed body have to be dismantled in order to mount the bag onto the center ringed body.

(2) Tearing of the dust-collection bag. The bag may be torn when the weight of the dust particles increases to a certain level and therefore the collected dust particles may be dropped and cleaning is more difficult. In view of the above, it is an object of the present invention to provide a dust-collecting structure for a dust-collecting device which can solve the above-mentioned drawbacks.

SUMMARY OF THE INVENTION

Accordingly, it is an object of the present invention to provide a dust-collection structure of a dust-collection device having a cart body, a dust-collection module, a moving seat and a dust-filtering module, characterized in that the cart body is provided with a blower having a driving member and the top face of the blower is provided wit a connection tube connecting to the dust-filtering module; the dust-collection module is a hollow cylindrical body positioned onto the cart and the cylindrical body is used to hold the dust-collection bag and the top edge of the cylindrical body is a connection body for mounting with the moving seat; the moving seat comprises two upward extended upright rods mounted at the cart body and the top end of the upright rod is pivotally connected with a corresponding extended shaft and the connecting body is locked between two extended shafts, and the circumferential edge of connection body is provided with a connection tube to connect with the dust-suction tube and the bottom end and the top end of the connection body and the dust-collection module and the dust-filtering module are provided with fastening structure which can be engaged or disengaged; and the dust-filtering module has an external hood body having a dust-filtering means and the top edge of the external hood body is provided with a connection tube, and the connection tube can be mounted to a soft hose connected to the connection tube of the blower, thereby the structure can be engaged and disengaged the moving set connection body and the dust-collection module and the connection body and the dust-filtering module are opened upward, the dust-collection bag for the dust-collection apparatus can be easily replaced.

Yet another object of the present invention is to provide a dust-collection structure of a dust-collection device, wherein the circumferential edge of the mounting tube of the blower is provided with an air-withdrawing tube connected to the bottom section of the cylindrical body of the dust-collection module.

Other object and advantages of the present invention will become more apparent from the following description taken in conjunction with the accompanying drawing.

DETAILED DESCRIPTION OF THE PREFERRED EMBODIMENT

Figure 1:
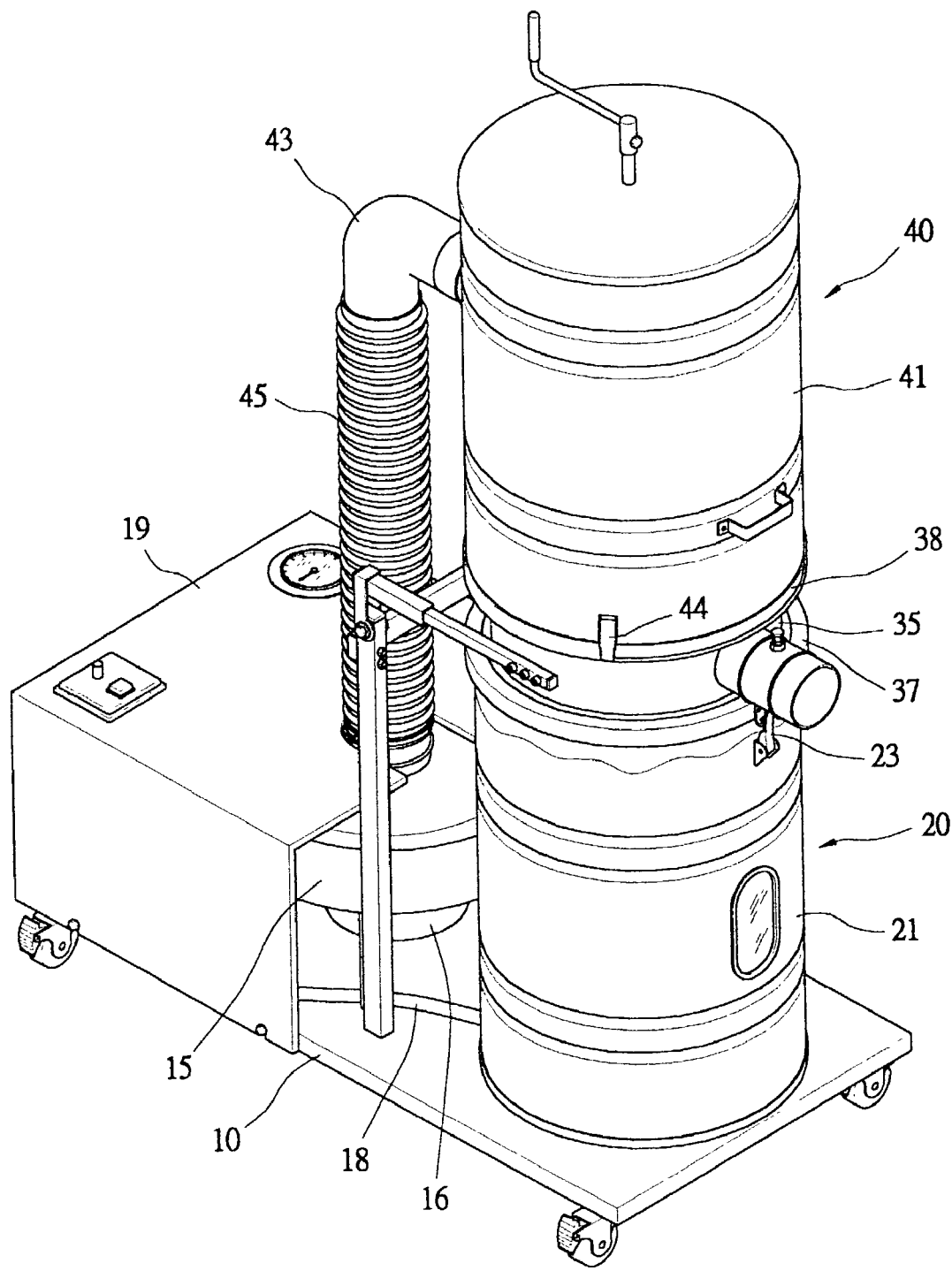
FIG. 1 is a perspective view of the dust-collection structure, showing a complete configuration, in accordance with the present invention.

Referring to FIG. 1, there is shown a dust-collection structure of a dust-collection device having a cart body 10, a dust-collection module 20, a moving seat 30 located at one side of the cart 10 and a dust-filtering module 20. The cart body 10 is provided with a blower 15 and the moving seat employs a connection body 35 and is mounted on to the top end of the dust-collection module 20. The upper section of the connection body 35 is mounted with a dust-filtering module 40 and via a soft hose 45, the dust-filtering module 40 is connected to the blower 15 on the cart 10.

Figure 2:
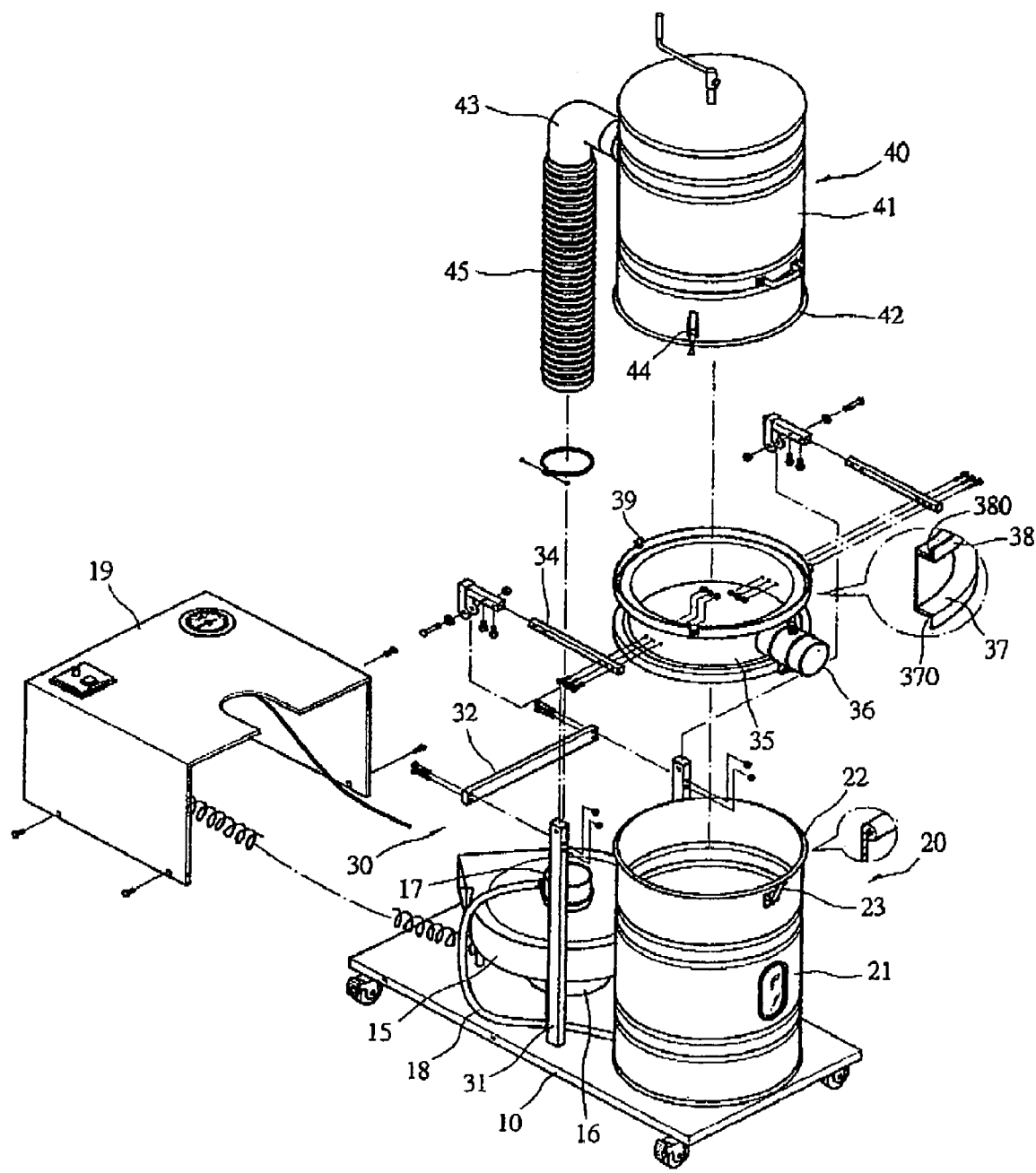
FIG. 2 is an exploded perspective view showing the constituted components and the relative position thereof in accordance with the present invention.

Referring to FIG. 2, the lower section at the blower 15 is provided with a driving member 16 which provided air stream. The top end of the blower 15 is protruded with a hollow connection tube 17 for connection to the dust-filtering module 40, and the circumferential edge of the connection tube 17 is provided with an air-withdrawing tube 18 connected to the bottom section of the dust-collection module 20. The cart 10 on the blower is provided with a housing 19 to enhance safety.

The dust-collection module 20 has hollow cylindrical body 21 for the mounting of a dust-collection bag 50. The air-withdrawing tube 18 is connected to the inner bottom section of the cylindrical body 21 so as to withdraw the air within the cylindrical body 21. The top edge of the cylindrical body 21 has an arch-shaped bend protruded ringed edge 22 and the external circumferential face of the cylindrical body 21 in the proximity of the top edge thereof is provided with a plurality of fastening members 23.

The moving seat 30 comprises two upward extended upright rods 31 mounted at the cart body 10 at the rear section of the dust-collection module 20. The top end of the upright rod 31 is pivotally connected with a corresponding extended horizontal shaft 32. The top end of the two upright rods 31 is pivotally mounted with an extended shaft 34 extending toward the dust-collection module 20, and the connecting body 35 is locked between two extended shafts 34, and the circumferential edge of connection body 35 is provided with a connection tube 36 to connect with the dust-suction tube. The bottom end and the top end of the connection body 35 are provided with an L-shaped bottom connection ring 37 and a top connection ring 38, and the inner bottom edge of the top and the bottom connection rings 38, 37 are provided with a press ringed slots 380, 370, wherein the ringed slot 370 is corresponding to the protruded edge 22 of the cylindrical body 21 and the external circumferential edge of the connection body is provided with fastening plate 39 corresponding to the fastening elements 44, 23, wherein the fastening plate 39 at the lower edge is used for the engagement of the fastening element 23 of the dust-collection module 20.

The dust-filtering module 40 has an external hood body 41 having a dust-filtering means (not shown), and the bottom edge of the hood body 41 is a protruded ringed edge 42 corresponding to the press ringed slot 380 on the top connection ring 38. In addition, the outer circumferential face of the external hood body 41 has a bottom edge and is provided with a plurality of fastening element 44 for mounting with the corresponding fastening plate 39 so that the dust-filtering module 40 is fastened to the top end of the connection body 35. The top edge of the external hood body 41 is provided with a connection tube 43, and the connection tube 43 can be mounted to a soft hose 45 connected to the connection tube 17 of the blower 15, thereby the structure allows easy and convenient replacement of the dust-collection bag 50.

Figure 3:
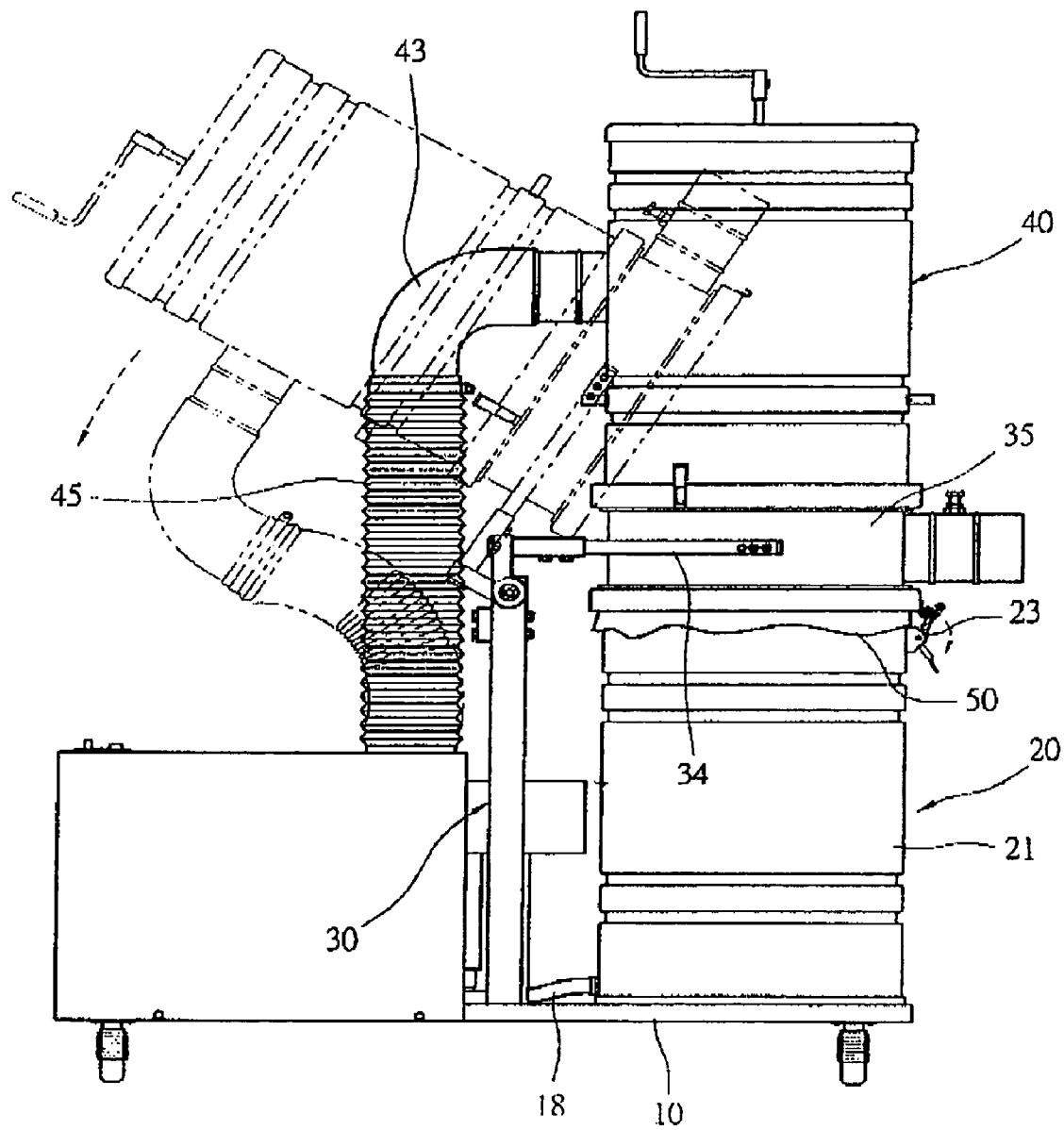
FIG. 3 is a schematic view of the dust-collection structure in actual operation in accordance with the present invention.
Figure 4:
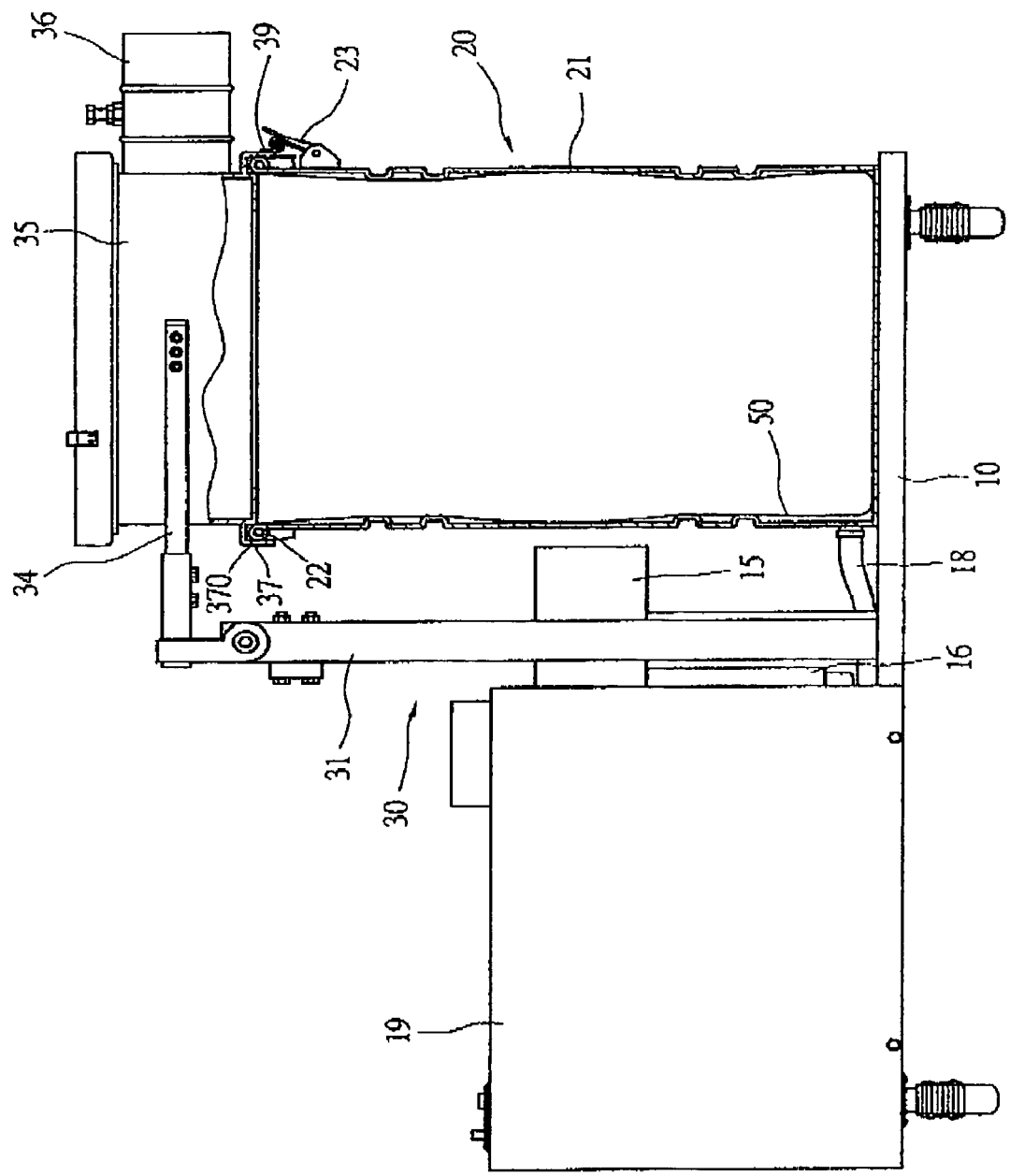
FIG. 4 is a sectional view of the dust-collection module, showing the installation of the dust-collection bag and the interior thereof in the course of operation of the dust-collection apparatus.

As shown in FIGS. 1, 3, and 4, when a dust-collection bag 50 is to be replaced, the fastening element 23 is released from the moving seat 30, and the upright rods 31 on the moving seat 30 allows the lifting of the connection body 35 together with the dust-filtering module 40. At this instance, the user mounts the dust-collection bag 50 to the cylindrical body 21 and the top edge of the dust-collection bag 50 is flipped to the external edge of the cylindrical body 21 and the connection body 35 is then covered. Thus the dust-collection bag 50 can be pressed and the sealing between the connection body 35 and the cylindrical body 21 can be improved.

When the user initiates the blower 15, due to the fact tat there is an air-withdrawing tube 18 connected the cylindrical body 21 and the blower 15, the air in the cylindrical body 21 and the dust-collection bag 50 is withdrawn and the dust-collection bag 50 is adhered to the inner edge face of the cylindrical body 21, the dust-collection bag 50 is prevented from over-turn, and thus the capacity of the dust-collection bag is increased.

In accordance with the present invention, the advantages of the dust-collection structure are as follows:

(1) Easy operation: The replacement of the dust-collection bag is easy and convenient and the user only opens the fastening element and the connection body and the dust-filtering module are simultaneously lifted.

(2) Large capacity: In combination with the use of the air-withdrawing tube at the bottom section of the cylindrical body, the dust-collection bag can be inflated sufficiently and this provides a larger capacity to contain dust particles.

(3) Sealability: As the dust-collection bag is directly mounted to the opening to the connection body and therefore the bag will not be torn and the sealability of the connection body and the dust-collection module is increased. Further, dislocation of the bag will not be occurred.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A dust-collection structure of a dust-collection device having a cart body, a dust-collection module, a moving seat and a dust-filtering module, characterized in that the cart body is provided with a blower having a driving member and the top face of the blower is provided with a connection tube connecting to the dust-filtering module; the dust-collection module is a hollow cylindrical body positioned onto the cart and the cylindrical body is used to hold a dust-collection bag and the top edge of the cylindrical body is a connection body for mounting with the moving seat; the moving seat comprises two upward extended upright rods mounted at the cart body and the top end of a respective one of the upright rods is pivotally connected with a corresponding extended shaft and the connection body is locked between two extended shafts, and the circumferential edge of the connection body is provided with the connection tube to connect with a dust-suction tube and the bottom end and the top end of the connection body and the dust-collection module and the dust-filtering module are provided with fastening structure which can be engaged or disengaged; and the dust-filtering module has an external hood body having a dust-filtering means and the top edge of the external hood body is provided with the connection tube, and the connection tube can be mounted to a soft hose connected to the connection tube of the blower, thereby the structure can be engaged and disengaged the connection body and the dust-collection module and the connection body and the dust-filtering module are opened upward, the dust-collection bag for the dust-collection apparatus can be easily replaced.

2. The dust-collection structure of a dust-collection device of claim 1, wherein the circumferential edge of the mounting tube of the blower is provided with an air-withdrawing tube connected to the bottom section of the cylindrical body of the dust-collection module.

3. The dust-collection structure of a dust-collection device of claim 1, wherein the blower is provided with a housing.

4. The dust-collection structure of a dust-collection device of claim 1, wherein the top edge of the cylindrical body of the dust-collection module has a protruded ringed edge and the bottom edge of the connection body of the moving seat is a bottom connection ring with an L-shaped cross section and the bottom edge of the bottom connection ring is a press ringed slot to enhance the tight sealing between the dust-collection module and the connection body.

5. The dust-collection structure of a dust-collection device of claim 1, wherein the bottom edge of the external hood body of the dust-filtering module is a protruded ringed edge having an arch-shaped bend and the top edge of the connection body of the moving seat is an L-shaped top connection ring having a press ringed slot to enhance the tight sealing between the dust-filtering module and the connection body.

6. The dust-collection structure of a dust-collection device of claim 1, wherein the fastening structure comprises a plurality of fastening members at the top edge around the circumferential edge of the cylindrical body of the dust-collection module and the circumferential edge of the bottom edge of the connection body of the moving seat is provided with fastening plates for mutual fastening.

7. The dust-collection structure of a dust-collection device of claim 1, wherein the fastening structure comprises a plurality of fastening members at the top edge around the circumferential edge of the cylindrical body of the dust-filtering module and the circumferential edge of the bottom edge of the connection body of the moving seat is provided with fastening plates for mutual fastening.

8. The dust-collection structure of a dust-collection device of claim 1, wherein the two upright rods are mounted across with a horizontal shaft to increase the strength of the dust-collection device.

9. The dust-collection structure of a dust-collection device of claim 1, wherein two brand rods on the moving seat are locked with an extended shaft extending toward the dust-collection module.

* * * * *